Figure 1:
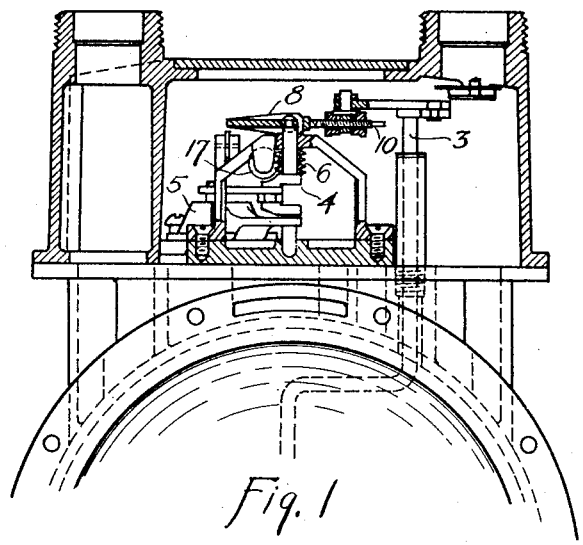

H. CHRISMAN.
TANGENT POST FOR GAS METERS.
APPLICATION FILED JULY 20, 1917.

1,350,067.

Patented Aug. 17, 1920.

INVENTOR.
Horace Chrisman
BY Green & McCallister
ATTORNEYS.

UNITED STATES PATENT OFFICE.

HORACE CHRISMAN, OF EDGEWOOD, PENNSYLVANIA, ASSIGNOR TO PITTSBURGH METER COMPANY, OF EAST PITTSBURGH, PENNSYLVANIA, A CORPORATION OF PENNSYLVANIA.

TANGENT-POST FOR GAS-METERS.

1,350,067.   Specification of Letters Patent.   Patented Aug. 17, 1920.

Application filed July 20, 1917. Serial No. 181,867.

*To all whom it may concern:*

Be it known that I, HORACE CHRISMAN, a citizen of the United States, and a resident of Edgewood, in the county of Allegheny and State of Pennsylvania, have made a new and useful Invention in Tangent-Posts for Gas-Meters, of which the following is a specification.

This invention relates to meters and has for an object to produce new and improved means for adjusting the position of the tangent so that the meter will register accurately.

In assembling meters it is necessary to adjust the tangent post or the tangent arm to compensate for variations in the volume of the gas chamber or chambers; and it is also necessary to adjust the position of the tangent post with relation to the crank shaft for the purpose of causing the meter to register correctly on varying rates of flow. The first mentioned adjustment is accomplished by adjusting the position of the point of connection between the drive member and the tangent post so that this point of connection is moved toward or away from the center of the crank shaft, which operates the valves and also the registering mechanism of the meter. This adjustment is well known in the meter art and is ordinarily made after the second mentioned adjustment, or what may be termed the valve setting adjustment of the meter, has been made. The so-called valve setting adjustment is accomplished by changing the position of the tangent arm around the crank shaft until a position is obtained which causes the meter to register accurately on different rates of flow. The production of simple, effective and reliable means for accomplishing this adjustment is the object of my present invention.

This adjustment is now accomplished by assembling the meter, putting it on test, noting the discrepancy as indicated by the registering apparatus on several different rates of flow, then unsoldering the tangent from the crank shaft, shifting its position and finally resoldering in the new position. This at best is a cut and try method and is accomplished under the most adverse conditions, since the tangent may have to be resoldered many times, even where the individual making the adjustment is skilled in making the adjustment and in the manual operation of soldering. In addition to the difficulty in making the adjustment, the heat required for resoldering the tangent to the crank shaft may injure either the tangent or the crank shaft and there is always the possibility of solder or acid dropping into the assembled parts and thereby damaging or detrimentally affecting the meter. In addition to this, making an adjustment in this way is likely to destroy the alinement of the tangent post relatively to the flag arm links, thus causing binding of the parts and detrimentally affecting the accuracy of the meter. All these difficulties are eliminated by the use of apparatus embodying my present invention.

In the drawings accompanying and forming a part hereof, Figure 1 is a fragmental sectional view of a meter equipped with a tangent arm embodying my invention.

Figure 2:
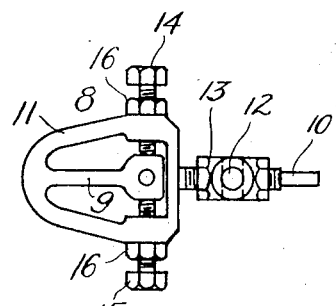

Fig. 2 is a plan view, on an enlarged scale, of a tangent arm embodying the novel features of my invention.

The meter illustrated in Fig. 1 may be considered as an exemplification of any fluid meter. It includes the usual flag wires 3 (one only being illustrated), the usual crank shaft 4, which actuates the valves 5 (one only being illustrated) and which also actuates the register mechanism. The register mechanism is not illustrated, but the actuating worm 6, mounted on the shaft 4, and the worm wheel 17, are clearly illustrated in Fig. 1.

The tangent arm 8, illustrated as an embodiment of my invention, is formed in a single piece and is adapted to be soldered or otherwise rigidly connected to the crank shaft 4 of the meter at or prior to the actual assembling of the parts of the meter. In order to accomplish the second adjustment above referred to, the tangent is especially formed so that it may, in effect, be turned to angular positions about the crank shaft 4 without the necessity of breaking the connection between it and the crank shaft. In the illustrated embodiment of the invention this is accomplished by providing the tangent with a resilient arm 9, the free end of which is adapted to be rigidly secured to the crank shaft and is capable of being held in adjusted positions with relation to the tangent arm proper for the purpose of accomplishing the second, or what may be termed the valve setting adjustment of the tangent arm.

Referring to Fig. 2: The tangent arm illustrated consists of a flag arm extension 10, a frame 11, and the resilient arm 9. As illustrated, these three elements are integrally formed, the extension 10 being screw threaded as is customary, and forming a support for the tangent pin 12. The tangent pin is adjustable along the extension 10 and is held in place between lock nuts 13 which are screwed on to the extension.

The frame 11 is in the form of a yoke, the arm 9 being integrally formed or rigidly secured to the arch of the yoke, and projecting toward and in proximity to the base of the yoke. The portion of the yoke to which the extension 10 is secured is termed the base of the yoke. The frame is provided with oppositely located set screws 14 and 15 which are so positioned that they are adapted to engage opposite sides of the free end of the arm 9. In the apparatus illustrated the set screws are so located that they engage the arm 9 at points immediately adjacent to the point of connection between the arm and the crank shaft 4. Each set screw is shown as provided with a lock nut 16, which is adapted to be screwed into locking engagement with the frame and to thereby lock the set screw on which it is mounted in the adjusted position. The tangent arm illustrated may be soldered to the crank shaft at any time during the operation of assembling of the meter. The soldering operation will preferably be performed before the assembling of the meter so that there will be no liability of dropping solder or acid into the assembled mechanism. The necessary adjustment is accomplished by loosening the set screw 14 or 15 and by tightening the other screw, thereby flexing the arm 9 and in effect turning the tangent arm to a new position about the crank shaft. It will be apparent that the necessary adjustment may be accomplished without disconnecting the tangent from the crank shaft and that it will therefore be accomplished with greater ease and precision than is the case where the adjustment is accomplished by first removing the tangent from the shaft. The important features of my invention are simplicity, effectiveness, and reliability of the apparatus. The tangent arm illustrated is not only of simple construction, being capable of being cast in one piece, but its use simplifies the operation of assembling the meter, since it enables the crank shaft and tangent arm to be permanently secured together before the meter is assembled, and since it permits the tangent and crank shaft to be assembled as one piece. The apparatus is reliable since there is no tendency for the tangent arm to lose its adjustment. Where the arm is formed of resilient material, and I preferably so form the arm, the resilience of the material will tend to lock the adjusting set screws in position, and the other, or locking set screw, may loosen without affecting the adjustment. For example, if the necessary adjustment occasioned a tightening of the set screw 14 and a loosening of the set screw 15, the arm 9 would be flexed from its central position toward the set screw 15 and would of itself exert a locking pressure on the adjusting set screw 14, and the set screw 15, under such conditions, would necessarily be employed as a locking screw since it would merely hold the arm 9 in the adjusted position and through the arm exert a locking pressure on the set screw 14.

It will be apparent to those skilled in the art that various changes, modifications, additions, and omissions may be made in the apparatus illustrated and that the relative position of the arm 9 may be varied with relation to the frame 11, and that the shape of the frame 11 may also be varied without departing from the spirit and scope of the invention as set forth by the appended claims.

What I claim is:

1. In combination with the crank shaft of a meter, a bendable crank shaft engaging member rigidly secured thereto, a flag arm connection integrally formed with said member and comprising a yoke adapted to surround the said crank shaft, and means carried by the yoke on opposite sides of the said crank shaft and adapted to adjust the yoke with respect to the said shaft, thereby adjusting the angular position of the said connection with relation to said crank shaft.

2. In combination with the crank shaft of a meter, a flexible crank shaft engaging member rigidly secured thereto, a flag arm connection integrally formed with said member and comprising a yoke adapted to straddle the said crank shaft, and set screws mounted in the yoke on opposite sides of the crank shaft and adapted to engage the said member, whereby the position of the yoke is adjusted with respect to the said shaft, thereby adjusting the angular position of the said connection with relation to said crank shaft.

3. In combination with the crank shaft of a meter, a flexible crank shaft engaging member rigidly secured thereto, a radial arm integrally formed with said member and comprising a yoke adapted to straddle the said crank shaft and extending radially from the shaft and terminating in an adjustable flag arm connection, and set screws mounted in the yoke at opposite sides of the crank shaft and operating at right angles with respect to the said arm and engaging the said member whereby the angular position of the said connection is adjusted with respect to the said shaft.

4. In combination with the crank shaft of a meter, a one piece tangent comprising a flexible member rigidly secured to the crank shaft, a flag-arm connection integrally formed with said member and so arranged that the point of flexure of said member, the point of connection of the flag-arm and the axis of the crank shaft are in substantially the same plane, and means for adjusting the position of said tangent with relation to said crank shaft by flexing said member and thereby moving said crank shaft to one side or the other of said vertical plane.

5. In combination with the crank shaft of a meter, a one piece tangent comprising a resilient member rigidly secured to the crank shaft, a flag-arm extension integrally formed with said member and extending in substantially the direction of the line defined by the point of flexure of said member and the crank shaft, a tangent pin mounted on said extension and adjustable longitudinally thereof, and means for adjusting the position of said tangent with relation to said crank shaft, by bending said resilient member and thereby moving said tangent so that the axis of the crank shaft falls to one side or the other of the line defined by the axis of said extension.

6. In combination with the crank shaft of a meter, a one piece tangent comprising a resilient member rigidly secured to the crank shaft, a flag-arm extension integrally formed with said member, a tangent pin mounted on said extension and adjustable longitudinally thereof, said flexible member and said extension being so arranged that the axis of the crank shaft is located between the point of flexure of said resilient member and said tangent pin and is located in substantially the same plane as the point of flexure of said member and the axis of the tangent pin, and means for flexing said member and thereby in effect turning said tangent about the axis of the crank shaft.

In testimony whereof, I have hereunto subscribed my name this 14th day of July, 1917.

HORACE CHRISMAN.

Witnesses:
C. W. McGHEE,
ANNA CLOHERTY.